(12) United States Patent
Martin

(10) Patent No.: US 7,937,503 B2
(45) Date of Patent: May 3, 2011

(54) APPARATUS FOR MAINTAINING A LIMIT VALUE OF A RESOURCE

(75) Inventor: Cameron Kenneth Martin, Lindfield (AU)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 11/850,953

(22) Filed: Sep. 6, 2007

(65) Prior Publication Data

US 2008/0133795 A1 Jun. 5, 2008

(30) Foreign Application Priority Data

Sep. 6, 2006 (GB) .................................. 0617470.0

(51) Int. Cl.
*G06F 3/00* (2006.01)
*G06Q 40/00* (2006.01)

(52) U.S. Cl. .................. 710/5; 710/36; 710/39; 705/35; 705/39

(58) Field of Classification Search ................ 710/5, 36, 710/39; 705/35, 39
See application file for complete search history.

(56) References Cited

U.S. PATENT DOCUMENTS

| 4,694,397 A * | 9/1987 | Grant et al. ..................... 705/42 |
| 7,505,937 B2 * | 3/2009 | Dilip et al. ...................... 705/37 |
| 7,536,350 B1 * | 5/2009 | Bent et al. ....................... 705/39 |
| 7,680,734 B1 * | 3/2010 | Bent et al. ....................... 705/40 |
| 2006/0059085 A1 * | 3/2006 | Tucker ............................ 705/38 |

* cited by examiner

*Primary Examiner* — Alford W Kindred
*Assistant Examiner* — David E Martinez
(74) *Attorney, Agent, or Firm* — Steven M. Greenberg, Esq.; Carey Rodriguez Greenberg & Paul, LLP

(57) ABSTRACT

An apparatus for maintaining a limit value of a resource for use in a concurrent limit checking system comprising: a resource having an associated limit value; a plurality of request handlers having access to a plurality of sub-limit values, wherein the sub-limit values when summed equal the limit value and wherein each request handler is operable to check a request value of a request for consuming the resource against its associated sub-limit value, in order to determine whether the request can be satisfied. The apparatus comprises a coordinator, responsive to the first request handler determining that the first request cannot be satisfied, for generating a coordination request comprising a coordination request value required to satisfy the first request, a receiver for receiving a coordination response from the second request handler; and an updater for updating the sub-limit values in accordance with the coordination request value.

13 Claims, 4 Drawing Sheets

APPARATUS FOR MAINTAINING A LIMIT VALUE OF A RESOURCE

FIELD OF THE INVENTION

The present invention provides an apparatus for maintaining a limit value of a resource for use in a concurrent limit checking system.

BACKGROUND OF THE INVENTION

A request for consumption of a resource is typically checked against a limit associated with the resource in order to ensure that the resource is not consumed beyond the limit.

In an example, with reference to FIG. 1, when a user at a client computer (105) submits a request to buy shares from a request processing system (120), an associated limit comprising a value (115) (residing on a limit value checking system (110)) is typically set (e.g. by the client computer (105), the limit value checking system (110) or the request processing system (120)).

The limit value is associated with the user's account and specifies a limit beyond which an associated resource (i.e. account funds) cannot be consumed. That is, an amount of funds associated with any request(s) for shares will not be permitted to exceed the limit value.

The limit value checking system (110) processes a request by checking a value of the request against the limit value (115) in order to determine whether the value exceeds the limit value. If the limit value is exceeded, the request is rejected or a notification is sent to the client computer (105).

If the limit value is not exceeded, the limit value checking system (110) passes the request to the request processing system (120) which processes the request.

The limit value checking system (110) can process plural requests received from a single account concurrently. However, there are risks associated with concurrent processing.

For example, an account has a limit value of £1000 and two concurrent requests to buy shares, each with a value of £501, are received. In response, two concurrent processes (each unaware of the other) make checks against the limit value and each process determines that a request to buy shares of a value of £501 will not exceed the limit value of £1000. Thus, both requests are authorised, however, the total value of both requests is £1002 (i.e. £2 over the limit value).

Thus, the authorisation of both requests causes risk, as the client computer (105) can request to buy shares having an aggregate value that exceeds the limit value placed on the user account. That is, the associated resource (e.g. account funds) can be consumed beyond the limit.

In order to prevent this risk, requests are checked serially. Thus, using the example above, a first request with a value of £501 is checked and passed to the request processing system (120) as the limit value will not be exceeded. A second request with a value of £501 will be rejected as the value of the second request causes the limit value to be exceeded.

However, a drawback of serial processing is that the time taken to serially check requests against a limit value causes a reduction in throughput of the overall request handling process. Thus, as request volumes for a single account increase (e.g. due to automated requestor computer programs), the reduction in throughput affects the ability of systems to meet the needs of users.

SUMMARY OF THE INVENTION

According to a first aspect there is provided an apparatus for maintaining a limit value of a resource for use in a concurrent limit checking system comprising: a resource having an associated limit value; a first request handler having access to a first sub-limit value; and a second request handler having access to a second sub-limit value; wherein the first sub-limit value and the second sub-limit value when summed equal the limit value and wherein each request handler is operable to check a request value of a request for consuming the resource against the associated sub-limit value, in order to determine whether the request can be satisfied; the apparatus comprising: a coordinator, responsive to the first request handler determining that the first request cannot be satisfied, for generating a coordination request comprising a coordination request value required to satisfy the first request; a transmitter for transmitting the coordination request to the second request handler; a receiver for receiving a coordination response comprising the coordination request value; and an updater for updating the first sub-limit value and the second sub-limit value in accordance with the coordination request value.

According to a second aspect there is provided a method for maintaining a limit value of a resource for use in a concurrent limit checking system comprising: a resource having an associated limit value; a first request handler having access to a first sub-limit value; and a second request handler having access to a second sub-limit value; wherein the first sub-limit value and the second sub-limit value when summed equal the limit value and wherein each request handler is operable to check a request value of a request for consuming the resource against the associated sub-limit value, in order to determine whether the request can be satisfied; the method comprising the steps of: generating, in response to the first request handler determining that the first request cannot be satisfied, a coordination request comprising a coordination request value required to satisfy the first request; transmitting the coordination request to the second request handler; receiving a coordination response comprising the coordination request value; and updating the first sub-limit value and the second sub-limit value in accordance with the coordination request value.

According to a third aspect there is provided a computer program comprising program code means adapted to perform all the steps of the method above when said program is run on a computer.

BRIEF DESCRIPTION OF THE DRAWINGS

The present invention will now be described, by way of example only, with reference to preferred embodiments thereof, as illustrated in the following drawings.

DETAILED DESCRIPTION OF THE PREFERRED EMBODIMENT

The preferred embodiment will now be described with reference to the figures.

Figure 1:
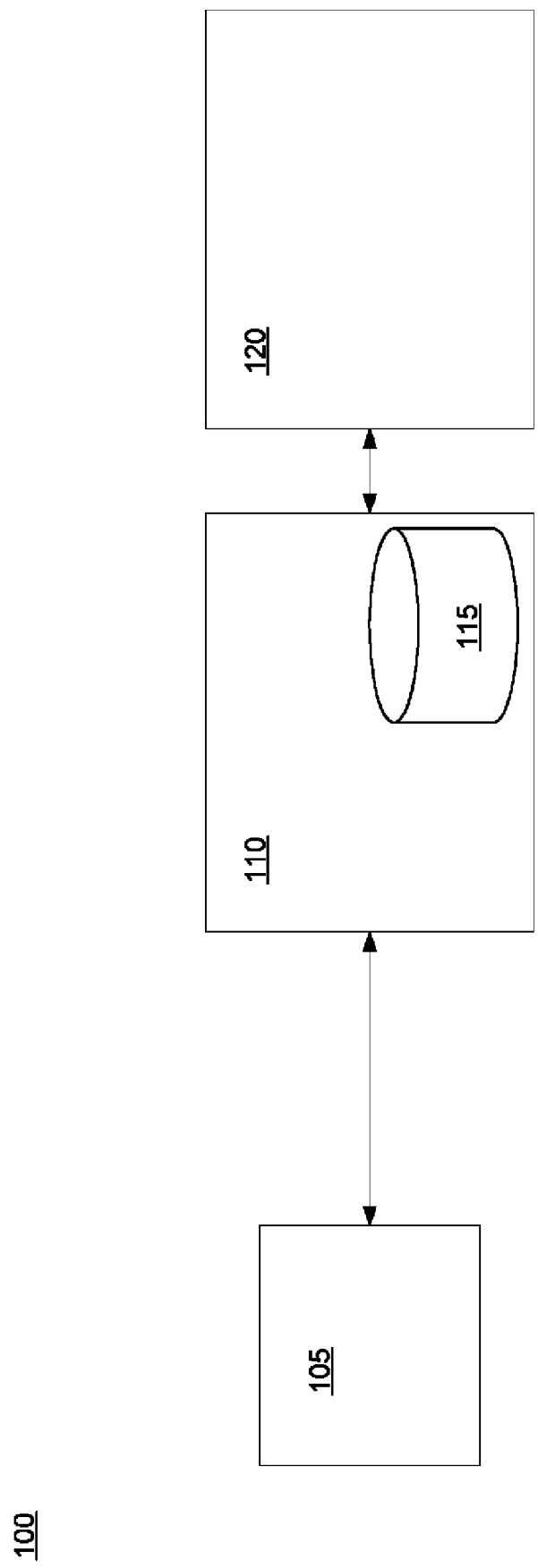
FIG. 1 is a block diagram of a prior art system for handling a request for a resource.
Figure 2:
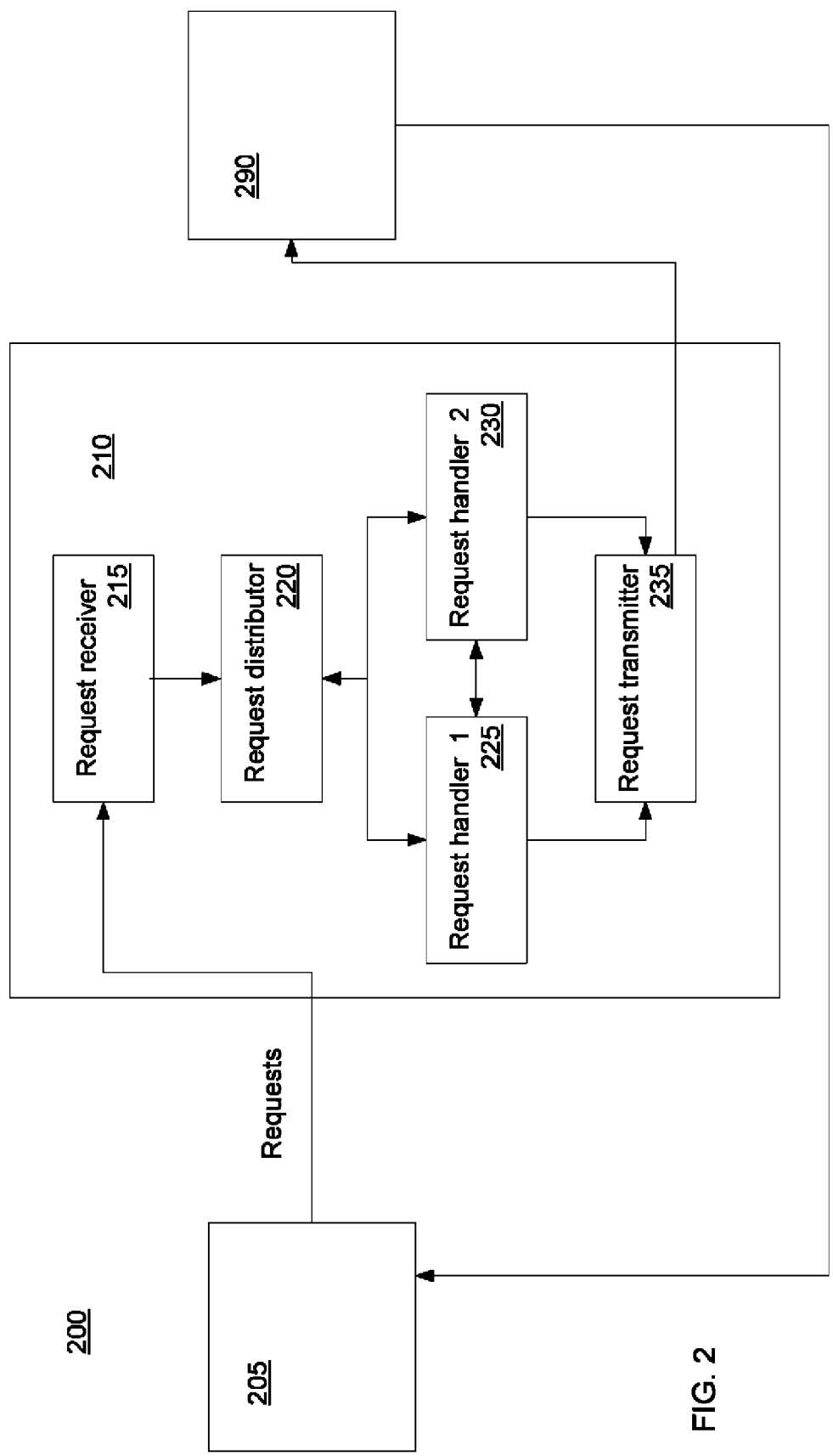
FIG. 2 is a block diagram of a system for handling a request for a resource according to the preferred embodiment.

With reference to FIG. 2, there is shown a system (200) in which the preferred embodiment may be implemented. There is shown a client computer (205), a limit value checking system (210) and a request processing system (290).

The request processing system (290) comprises identifiers associated with account funds (the resource, in this case).

The limit value checking system (210) comprises a request receiver (215) operable to communicate with the client computer (205) concurrently, a request distributor (220) operable to communicate with the request receiver (215); a first request handler (225) and a second request handler (230)—225 & 230 handle requests for a user account (in the examples described herein, a single user account is handled)—each of which is operable to communicate with the request distributor (220); and a request transmitter (235) operable to communicate with the first request handler (225), the second request handler (230) and the request processing system (290).

Figure 3:
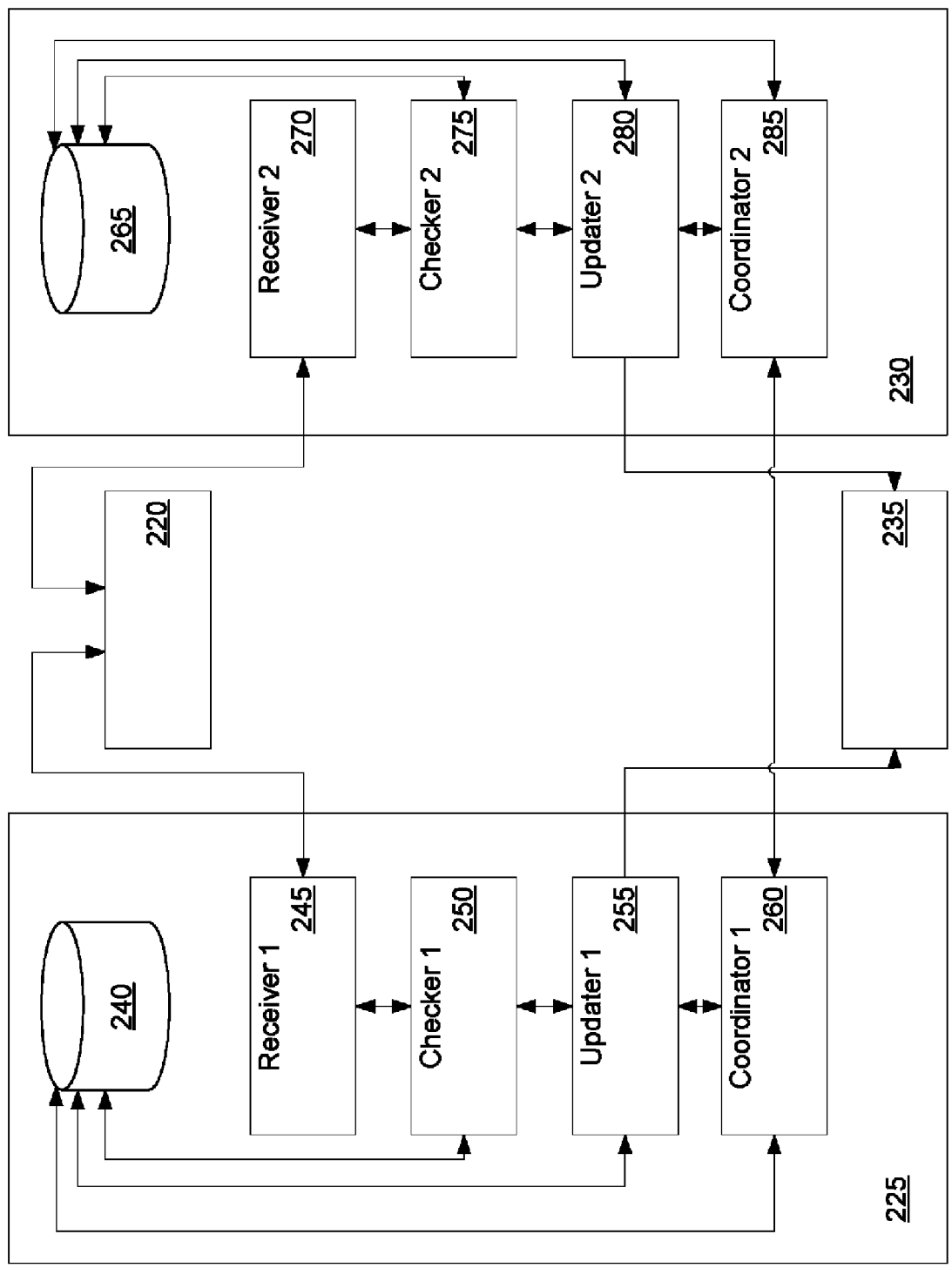
FIG. 3 is a block diagram showing in more detail a request handler of the system of FIG. 2.
Figure 4:
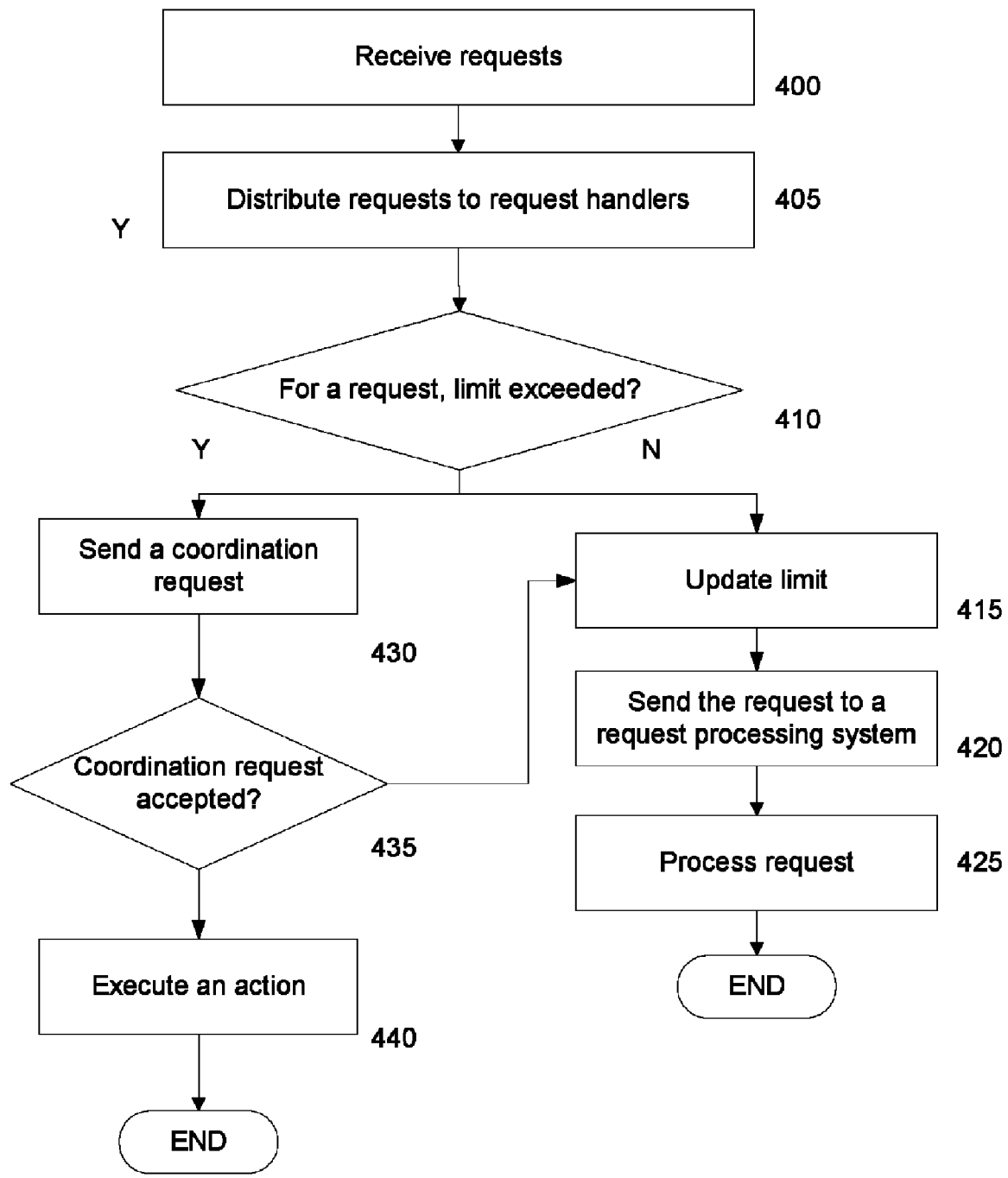
FIG. 4 is a flow chart showing the operational steps involved in a process according to the preferred embodiment.

The first request handler (225) and the second request handler (230) are shown in greater detail in FIG. 3. Each request handler comprises a storage component (240, 265) for storing a value associated with limit beyond which an associated resource (e.g. account funds) cannot be consumed—in the examples described herein, each limit is assigned randomly and a receiver (245, 270) operable to communicate with the request distributor (220).

Each request handler also comprises a checker (250, 275) operable to communicate with the receiver (245, 270 respectively) and the storage component (240, 265 respectively).

Each request handler also comprises an updater (255, 280) operable to communicate with the checker (250, 275 respectively), the storage component (240, 265 respectively) and the response transmitter (235).

Each request handler also comprises a coordinator (260, 285) operable to communicate with the updater (255, 280 respectively), the storage component (240, 265 respectively) and the coordinator of another request handler.

A first example will now be described with reference to the figures. In the first example, limit values (stored in storage components 240 and 265 respectively) associated with the first request handler (225) and the second request handler (230) are shown below:

First request handler (225):
First limit value=£600
Second request handler (230):
Second limit value=£400

In the first example, at step 400, the request receiver (215) receives a first request and a second request to buy shares from the client computer (205). The values of the first request and the second request are shown below:

First request:
Value=£450
Second request:
Value=£300

The request receiver (215) passes the requests to the request distributor (220), which uses a distribution policy to distribute the requests.

In the first example, the distribution policy governs that the requests be distributed randomly, wherein one request is distributed to one request handler.

At step 405, in accordance with the distribution policy, the request distributor (220), distributes the first request to the first request handler (225) and the second request to the second request handler (230).

Receiver 1 (245) receives the first request and Receiver 2 (270) receives the second request.

At step 410, Checker 1 (250) checks the value of the first request against the first limit value stored in the storage component (240) in order to determine whether the value of the first request (£450) exceeds the first limit value (£600).

If the value of the first request exceeds the first limit value, step 425 is executed as will be described with reference to the second example.

In the first example, Checker 1 (250) determines that the value of the first request does not exceed the first limit value.

At step 415, Updater 1 (255) updates the first limit value i.e. the first limit value is decreased to £150.

In response to the update, as the first limit value would not be exceeded, at step 420, Updater 1 (255) passes the first request to the request transmitter (235) which passes the first request to the request processing system (290).

The request processing system (290) processes (step 425) the first request. Preferably, the request processing system (290) sends a notification to the client computer (205), acknowledging that the first request has been processed.

Likewise, at step 410, Checker 2 (275) (concurrently) checks the value of the second request against the second limit value stored in the storage component (265) in order to determine whether the value of the second request (£300) exceeds the second limit value (£400). If the value of the second request exceeds the second limit value, step 430 is executed as will be described with reference to the second example.

In the first example, Checker 2 (275) determines that the value of the second request does not exceed the second limit value.

At step 415, Updater 2 (280) updates the second limit value i.e. the limit value is decreased to £100.

In response to the update, as the second limit value would not be exceeded, at step 420, Updater 2 (280) passes the second request to the request transmitter (235) which passes the second request to the request processing system (290).

The request processing system (290) processes (step 425) the second request. Preferably, the request processing system (290) sends a notification to the client computer (205), acknowledging that the second request has been processed.

A second example will now be described with reference to the figures. In the first example, limit values (stored in storage components 240 and 265 respectively) associated with the first request handler (225) and the second request handler (230) are shown below:

First request handler (225):
Third limit value=£300
Second request handler (230):
Fourth limit value=£400

In the second example, at step 400, the request receiver (215) receives a third request and a fourth request to buy shares from the client computer (205). The values of the third request and the fourth request are shown below:

Third request:
Value=£350
Fourth request:
Value=£300

The request receiver (215) passes the requests to the request distributor (220), which uses a distribution policy to distribute the requests.

In the second example, the distribution policy governs that the requests be distributed randomly, wherein one request is distributed to one request handler.

At step 405, in accordance with the distribution policy, the request distributor (220), distributes the third request to the first request handler (225) and the fourth request to the second request handler (230).

Receiver 1 (245) receives the third request and Receiver 2 (270) receives the fourth request.

At step 410, Checker 1 (250) checks the value of the third request against the third limit value stored in the storage component (240) in order to determine whether the value of the third request (£350) exceeds the third limit value (£300).

In the second example, the value of the third request exceeds the third limit value and step 430 is executed. That is, Coordinator 1 (260) sends a coordination request to Coordinator 2 (285).

In the second example, the coordination request comprises a coordination request value which when summed with the third limit value generates a new limit value. The value of the third request can not exceed the new limit value. In the second example, the coordination request value is £50.

In the second example, Coordinator 2 (285) receives the coordination request before Coordinator 2 (285) executes step 410.

At step 435, in response to receiving the coordination request, Coordinator 2 (285) determines whether the coordination request can be met. That is, Coordinator 2 (285) checks whether the coordination request value (£50) can be provided from the fourth limit value (£400).

If the coordination request cannot be met, preferably, an action is executed (step 440) (e.g. a notification is sent to the client computer).

In the second example, Coordinator 2 (285) determines that the coordination request value (£50) can be provided from the fourth limit value (£300). Preferably, Coordinator 2 (285) sends a coordination response comprising the coordination request value (£50) and updates the fourth limit value (i.e. the fourth limit value is decreased to £350).

In response to receiving the coordination response, Coordinator 1 (260) sums the coordination request value (£50) and the third limit value (£300) to generate a new limit value (£350).

At step 415, Updater 1 (255) updates the new limit value i.e. the new limit value is decreased to £0.

In response to the update, as the new limit value would not be exceeded, at step 420, Updater 1 (255) passes the third request to the request transmitter (235) which passes the third request to the request processing system (290).

The request processing system (290) processes (step 425) the third request. Preferably, the request processing system (290) sends a notification to the client computer (205), acknowledging that the third request has been processed.

At step 410, Checker 2 (275) checks the value of the fourth request against the fourth limit value stored in the storage component (265) in order to determine whether the value of the fourth request (£300) exceeds the fourth limit value (£350). That is, requests are handled concurrently across request handlers and requests are handled serially by an individual request handler.

If the value of the fourth request exceeds the fourth limit value, step 425 is executed as described above.

In the second example, Checker 2 (275) determines that the value of the fourth request does not exceed the fourth limit value.

At step 415, Updater 2 (280) updates the fourth limit value i.e. the limit value is decreased to £50.

In response to the update, as the fourth limit value would not be exceeded, at step 420, Updater 2 (280) passes the fourth request to the request transmitter (235) which passes the fourth request to the request processing system (290).

The request processing system (290) processes (step 425) the fourth request. Preferably, the request processing system (290) sends a notification to the client computer (205), acknowledging that the fourth request has been processed.

Advantageously, values of requests can be concurrently checked against limit values, thereby increasing throughput of the overall request handling process.

Furthermore, the risk associated with concurrent processing is eliminated by providing a coordination feature, such that a resource cannot be consumed beyond a limit.

There are a number of optimisation mechanisms that are provided by the present invention to balance the concurrent processing of requests and the invocation of the coordination feature.

In a first optimisation mechanism, distribution of limit values over request handlers is selectively assigned by an assignor.

In a first example, a larger limit value is associated with a first request handler and a relatively smaller limit value is associated with a second request handler. Preferably, the request distributor distributes requests in accordance with the first optimisation mechanism. For example, the request distributor uses a distribution policy that governs that a first request having a relatively larger value than a second request is sent to the first request handler and the second request is sent to the second request handler.

In a second example, distribution of limit values is governed in accordance with statistical data e.g. data associated with an average value of requests that have been handled by a request handler.

Thus, the first optimization mechanism provides an environment wherein a request is likely to be met by a request handler without the need for coordination. That is, if most of a limit value is held by a single request handler, other request handlers may require coordination in order to be able to fulfill requests. Alternatively, if limit values are distributed evenly across all request handlers, a single request handler will be unable to fulfill a request having a relatively large value compared with the limit value without the need for coordination.

In a second optimisation mechanism, a number of request handlers are selectively invoked/deselected by an invoker.

For example, a number of request handlers are invoked in accordance with statistical data associated with previous request handling.

In a first example, if a threshold associated with a number of requests is exceeded, further request handlers are invoked. In a second example, if a time period threshold has expired, one or more request handlers are invoked or deselected. In a third example, request handlers are invoked/deselected in accordance with a rate at which requests need to be handled.

In the examples described herein, each request handler comprises a coordinator. Alternatively, a coordinator function is provided by a central coordinator.

In one example, a request handler sends a coordination request to all other request handlers. In another example, a request handler sends a coordination request to a subset of the other request handlers.

In the examples described herein, a single user account is handled. In another example, multiple user accounts are handled and preferably, an identifier associated with a user account is associated with a request sent by a client computer.

In the second example, the coordination request value, when summed with a limit value, generates a new limit value. The value of a request equals the new limit value. In another example, the coordination request has a coordination request value such that the value of a request is less than the new limit value. In yet another example, the coordination request has a coordination request value with an associated range; e.g. "no less than £50 and up to £1000".

It should be understood that if a coordination request cannot be met, preferably it is re-sent after a time threshold has expired. Preferably, a coordination request is re-sent a (configurable) number of times before a request is eventually rejected. Alternatively, a coordination request is re-sent a number of times within a (configurable) time period before a request is eventually rejected.

In the second example described herein, a single coordination request comprising a coordination request value is sent. It should be understood that alternatively, multiple coordination requests comprising sub-coordination request values can be sent to a plurality of request handlers.

In the examples described herein, a limit value is strictly enforced, such that a request value cannot exceed a limit value. However, in another example, a limit value may not be strictly enforced in that a flexible limit value above (or below) the limit value can also be set. For example, a limit value is £500, a flexible limit value is +£100—thus, a request for £600 (which exceeds the limit value but not the limit value summed with the flexible limit value) is still met.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the preferred embodiment of the present invention may be realized in the form of computer implemented method of deploying a service comprising steps of deploying computer program code operable to, when deployed into a computer infrastructure and executed thereon, cause said computer system to perform all the steps of the described method.

It will be clear to one skilled in the art that many improvements and modifications can be made to the foregoing exemplary embodiment without departing from the scope of the present invention.

The invention claimed is:

1. A computer hardware system for maintaining a limit value of a resource, comprising:
 a plurality of request handlers including
  a first request handler having an associated first sub-limit value, and
  a second request handler having an associated second sub-limit value; and
 a distributor configured to distribute a received resource request to one of the plurality of request handlers, wherein
 each request handler of the plurality of request handlers is configured to receive the resource request,
  check a request value of the resource request, received from the request distributor, against a sub-limit value associated with the request handler,
  transmit, upon a determination that the request handler cannot satisfy the resource request, an outgoing coordination request to a different request handler, the coordination request including a coordination request value needed to satisfy the resource request,
  receive an incoming coordination request from a different request handler, and
  update the submit-limit value associated with the request handler based upon either the outgoing coordination request or the incoming coordination request, and
 the sum of sub-limit values of the plurality of request handlers equaling the limit value of the resource.

2. The system of claim 1, wherein
each request handler of the plurality of request handlers is
 further configured to
  transmit an outgoing coordination response in response to a determination that the request handler can provide a coordination request value identified within the incoming coordination request.

3. The system of claim 1, wherein
the first sub-limit value is greater than the second sub-limit value, and
the distributor is configured to
 distribute a resource request having a relatively larger value to the first request handler, and
 distribute a resource request having a relatively smaller value to the second request handler.

4. The system of claim 1, wherein
each request handler of the plurality of request handlers is
 further configured to
  transmit the outgoing coordination request to all others of the plurality of request handlers.

5. The system of claim 1, wherein
each request handler of the plurality of request handlers is further configured to
transmit the outgoing coordination request to a subset of all others of the plurality of request handlers.

6. A method, within a computer hardware system, for maintaining a limit value of a resource, comprising:
distributing, by the computer hardware system, a resource request for the resource to a first request handler from among a plurality of request handlers, the first request handler having an associated first sub-limit value;
checking a request value of the resource request against the first sub-limit value;
transmitting, upon a determination that the first request handler cannot satisfy the resource request, a coordination request, to a second request handler having a second sub-limit value, the coordination request including a coordination request value needed to satisfy the request;
transmitting, upon a determination that the second request handler can provide the coordination request value, a coordination response to the first request handler;
updating the first and second submit-limit values respectively associated with the first request handler and the second request handler using the coordination request value, wherein
the sum of sub-limit values of the plurality of request handlers equaling the limit value of the resource, and
the first request handler and the second request handler are configured to receive the resource request.

7. The method of claim 6, further comprising
distributing a resource request having a relatively larger value to the first request handler, and
distributing resource request having a relatively smaller value to the second request handler, wherein
the first sub-limit value is greater than the second sub-limit value.

8. The system of claim 6, wherein
the outgoing coordination request is transmitted to all others of the plurality of request handlers.

9. The system of claim 6, wherein
the outgoing coordination request is transmitted to a subset of all others of the plurality of request handlers.

10. A computer program product comprising a computer usable storage medium having stored therein computer usable program code for maintaining a limit value of a resource, the computer usable program code, which when executed by a computer hardware system causes the computer hardware system to perform:
distributing a resource request for the resource to a first request handler from among a plurality of request handlers, the first request handler having an associated first sub-limit value;
checking a request value of the resource request against the first sub-limit value;
transmitting, upon a determination that the first request handler cannot satisfy the resource request, a coordination request, to a second request handler having a second sub-limit value, the coordination request including a coordination request value needed to satisfy the request;
transmitting, upon a determination that the second request handler can provide the coordination request value, a coordination response to the first request handler;
updating the first and second submit-limit values respectively associated with the first request handler and the second request handler using the coordination request value, wherein
the sum of sub-limit values of the plurality of request handlers equaling the limit value of the resource, and
the first request handler and the second request handler are configured to receive the resource request.

11. The computer program product of claim 10, wherein the computer hardware system is further caused to perform
distributing a resource request having a relatively larger value to the first request handler, and
distributing resource request having a relatively smaller value to the second request handler, wherein
the first sub-limit value is greater than the second sub-limit value.

12. The computer program product of claim 10, wherein
the outgoing coordination request is transmitted to all others of the plurality of request handlers.

13. The computer program product of claim 10, wherein
the outgoing coordination request is transmitted to a subset of all others of the plurality of request handlers.

* * * * *